INVENTORS
LEONARD P. KEDSON
FERNANDO BIAGI
BY
Harry A. Herbert Jr. and
Robert Kern Duncan
ATTORNEYS

INVENTORS
LEONARD P. KEDSON
FERNANDO BIAGI

BY Harry A. Herbert Jr. and Robert Kern Duncan
ATTORNEYS

United States Patent Office 3,452,218

Patented June 24, 1969

3,452,218

COMPLEX WAVE DIFFERENTIATOR HAVING AUTOMATIC SWITCHING OF CONSTANTS OF DIFFERENTIATION

Leonard P. Kedson, Elberon, N.J., and Fernando Biagi, Bethesda, Md., assignors to the United States of America as represented by the Secretary of the Air Force Filed Mar. 4, 1966, Ser. No. 534,293

Int. Cl. G06g 7/18

U.S. Cl. 307—229 4 Claims

ABSTRACT OF THE DISCLOSURE

The complex wave to be differentiated is fed to a plurality of resistance-capacitance differentiating circuits, each having different constants of differentiation with each differentiating circuit controlled by a diode gate to permit or inhibit differentiation. The proper diode gate is activated by an associated integrator responsive to a range of predetermined time intervals of the zero-crossings of the complex wave which are sensed by a ring diode circuit.

For certain applications in decision theory, it is desirable to automatically and correctly differentiate a complex input waveform of any shape, and provide an output signal proportional to the derivative of the input. Previous differentiators using available techniques have an amplitude variation of over a million-to-one in their output from signals at the lower end of the spectrum compared to one at the higher end, when used to differentiate frequencies over a twenty octave range. For an amplifier or indicator to utilize this signal, without input switching, would mean that it would have to have an input stage capable of encompassing signals having over 120 db of range. This has been found to be prohibitive.

This invention sets forth a system that will automatically, electronically, and essentially instantaneously, switch into the circuit different differentiators, providing discrete steps of differentiation, in accord with the frequency characteristics of the input signal to be differentiated, thus minimizing amplitude variations in the differentiated output signal. Accordingly it is an object of the present invention to provide an electronic differentiator that will differentiate complex waves and provide a differentiated output signal whose amplitude level is relatively independent of the frequency of the incoming signal to be differentiated.

Another object of the present invention is to provide an electronic system that will electronically switch, in essentially real time, the electrical constants of differentiation in accord with the frequency of the incoming signal.

Another object of the present invention is to provide a system that will correctly differentiate pulsed and nonpulsed continuous signals.

Figure 1:
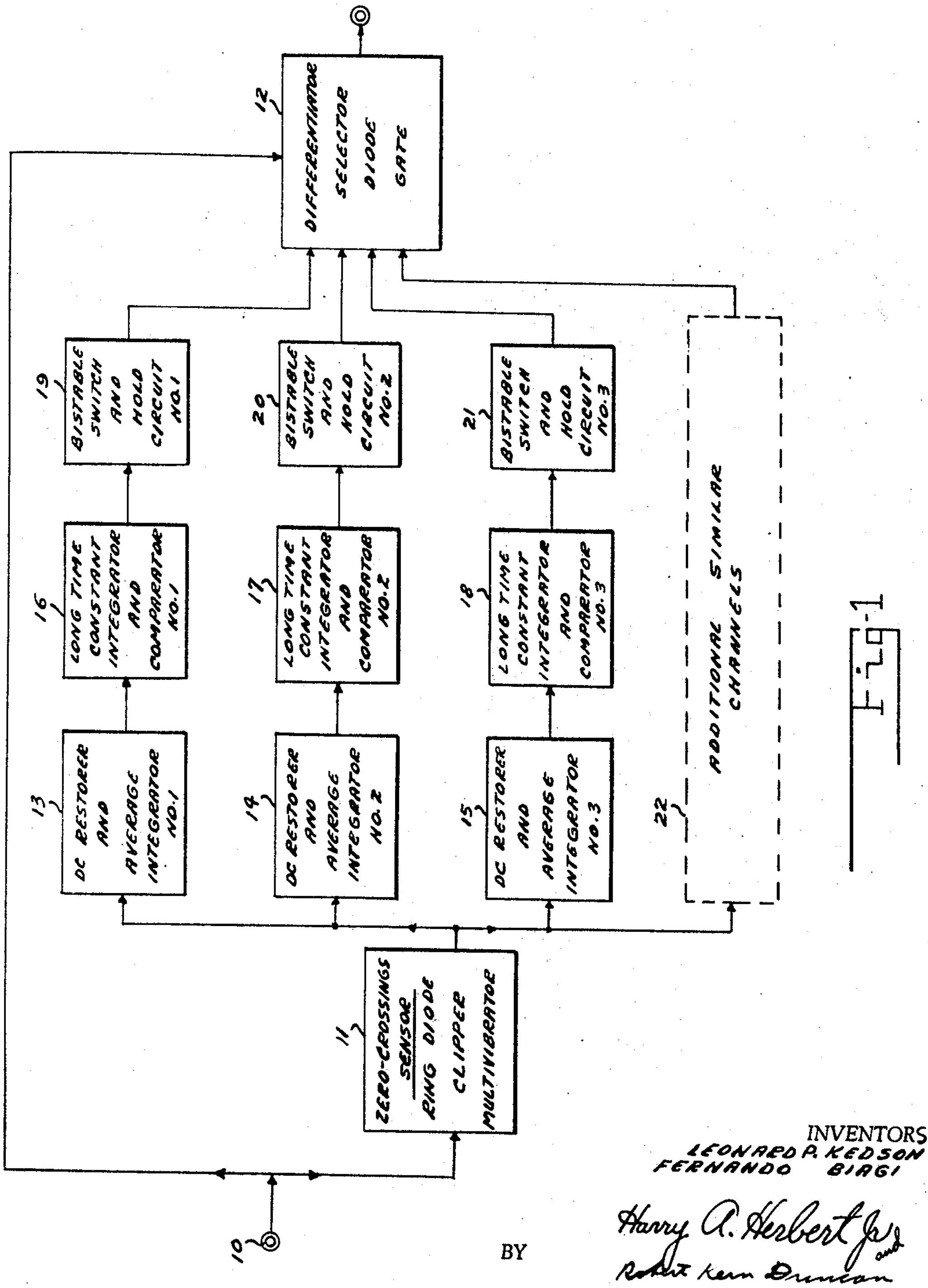
Figure 2:
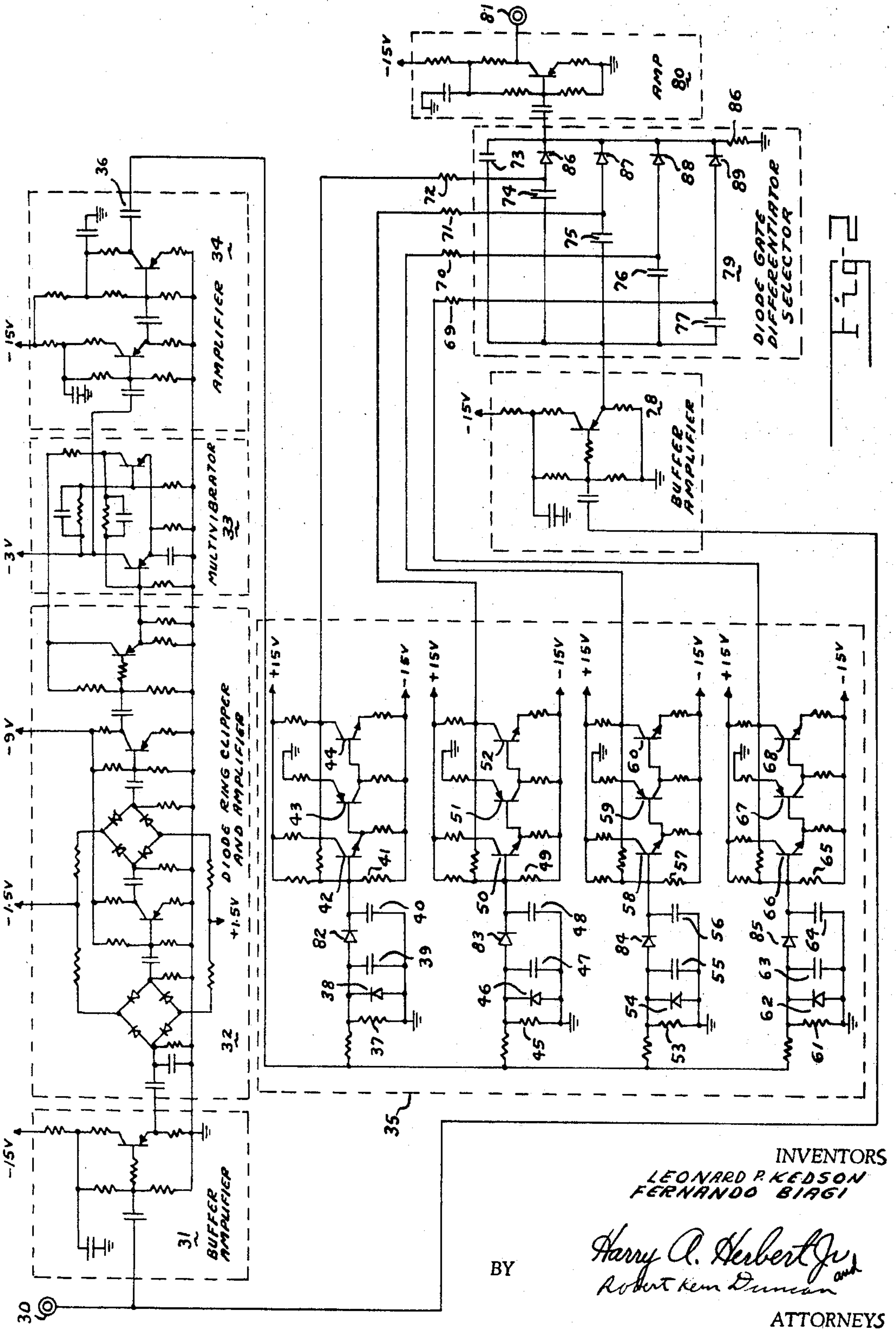

The above objects and others ancillary thereto, will become apparent from the following detailed description to be read in connection with the accompanying drawings, in which:

FIG. 1 is a block diagram of the electronic system in accordance with the invention; and FIG. 2 is a schematic circuit diagram of an embodiment of the invention.

In order to correctly differentiate a pulsed signal, the pulse width averaged over a period of time is used as the differentiating criteria. For non-pulsed, continuous signals, the frequency of occurrence of the zero-crossings will determine the correct differentiator automatically selected by the system. Briefly, the output of a zero-crossings indicator triggers a multivibrator, the output of which is then passed to average integrators connected in parallel. Each integrator has a different time constant. A DC restorer makes the integrating circuit relatively insensitive to duty cycle. The output of the averaging integrator is then further integrated in very long time constant integrators driving bistable amplifiers. The output of the bistable switching amplifiers actuate diode switches, by opening or blocking the diodes, thus switching in the correct signal differentiating circuit in accord with the frequency of the input signal.

By using the appropriate time constants in the average integrators, each of the bistable devices will be triggered at predetermined "break" frequencies, thus switching in the appropriate differentiator at the desired time. The differentiator used will then depend on the average pulse width of the input pulsed signal, and is practically independent of duty-cycle.

Referring to FIG. 1, the complex wave signal to be differentiated enters the system at the input terminal 10. The signal is fed both to the selection part of the system commencing with the zero crossings sensor 11, and to the discrete differentiators in the differentiator selector diode gate 12. The zero-crossings of the input signal are obtained by the ring diode circuit and used to trigger a multivibrator. The output of the multivibrator of the zero-crossings sensor 11 is fed in parallel to the average integrators 13, 14, 15 and the integrators of any additional channels 22. The number of channels used depends on the frequency range that it is desired to encompass by the system, and the frequency range of each discrete differentiator. Each averaging integrator has a different time constant. The DC restorer contained in the average integrator circuit tends to make the system insensitive to duty cycle variations. The outputs from the average integrators are then further integrated in the long time constant integrators 16, 17, 18, (and 22), compared with a fixed bias, and then fed to a bistable switch and hold circuit 19, 20, 21, (and 22). By using appropriate time constants in the average integrators, each of the bistable devices will be triggered at the decided "break" frequencies. This will cause the differentiator selector diode gate 12 to automatically switch in the appropriate differentiator at the desired time.

FIG. 2 shows a detailed schematic diagram of an operating embodiment of the invention. The supply voltages are shown for ease in understanding the operation of this specific embodiment, and are not to be considered limiting. The input signal enters the system at connector 30 and is applied through the buffer amplifier 31 to the diode ring clipper and amplifier 32 wherein the zero crossovers of the input signal are clearly defined by the action of clipping and amplification. The multivibrator 33 responds to the output of the diode ring clipper and amplifier to produce square wave signals having a width defined by the zero crossovers defined in the clipper and amplifier stages and, hence, inversely related to the frequency of the input signal. The output of the multivibrator is amplified by amplifier 34, and in this particular embodiment fed in parallel to four switch channels 35. Each switch channel comprises a DC restorer, an average integrator, a long time constant integrator, and a bistable switch.

The first switch channel comprises a DC restorer including the capacitor 36, at the output of amplifier 34, resistor 37 and diode 38; an average or short time integrator including resistor 37 and capacitor 39, a long time constant integrator including capacitor 40 and resistor 41; and a bistable amplifier switch including transistors 42, 43 and 44 and their bias resistors. The second switch channel comprises a DC restorer including capacitor 36, resistor 45 and diode 46; an average or short time integrator including resistor 45 and capacitor 47; a long time constant integrator including capacitor 48 and resistor 49; and a bistable amplifier switch including transistors 50, 51 and 52 and their bias resistors. The third switch channel comprises a DC restorer including capacitor 36, resistor 53, and diode 54; an average or short time integrator including resistor 53 and capacitor 55; a long time constant integrator including capacitor 56 and resistor 57; and a bistable amplifier switch including transistors 58, 59 and 60 and their bias resistors. The fourth switch channel comprises a DC restorer including capacitor 36, resistor 61, and diode 62; an average or short time integrator including resistor 61 and capacitor 63; a long time constant integrator including capacitor 64 and resistor 65; and a bistable amplifier switch including the transistors 66, 67, and 68 and their bias resistors.

The specific operating embodiment of this invention as shown schematically in FIG. 2 has an input frequency range of less than 5 c.p.s. to approximately 5 mcs. The input signal amplitude can vary over a dynamic range of 40 db. The frequency range of the system is over 20 octaves, and as previously set forth this range may readily be extended. The amplitude variance of the output signal does not vary more than 20 db. When this embodiment is used to differentiate pulsed signals proper operation may be obtained down to pulsed having a duty cycle of less than 1%.

For illustration only, the component values in this specific embodiment that are of particular interest in understanding the operation of the invention are

| Capacitors: | Mfd. |
|---|---|
| 39 | 0.0025 |
| 47 | 0.015 |
| 55 | 0.15 |
| 63 | 1.0 |
| 40, 48, 56, and 64 | 8 |
| 73 | 0.0011 |
| 74 | 0.0033 |
| 75 | 0.033 |
| 76 | 0.2 |
| 77 | 1.0 |

| Resistors: | Ohms |
|---|---|
| 37, 45, 53, and 61 | 4,700 |
| 41 | 158,500 |
| 49 | 192,000 |
| 57 | 210,500 |
| 65 | 220,000 |
| 69, 70, 71 and 72 | 4,700 |

It is apparent from the values of capacitors 39, 47, 55 and 63 that the average integrators will respond to different frequencies and are thus utilized to identify the "break" point or division between one frequency segment and the next frequency segment. Likewise, the base resistors of the first transistor of each of the bistable switches provide a different bias potential and, hence, a different conduction level for the bistable switches. This bias potential or fixed bias for each of the switches enables comparison of the output of the average integrators of each of the switch channels through the conduction characteristics of diode 82, 83, 84 and 85. When the voltage stored in the capacitor of the average integrator reaches a potential relative to the base potential of the first transistor (42, 50, 58 or 66) of the bistable switches, the diode (82, 83, 84, or 85) associated therewith will be rendered conductive which will trigger the associated bistable switch from a nonconducting condition to a conducting condition. This as how a comparison is made between the information contained in the average integrator and the fixed bias, thus each of the average integrators responds to a different frequency range and the base potential of the first transistor of the bistable switch has a different bias applied thereto proportionate to the time constant of the average integrator.

The conduction of a particular bistable switch renders its associated diode (86, 87, 88 or 89) in the diode gate differentiator selector 79, conductive which then places its associated differentiating capacitor (74, 75, 76, or 77) in parallel with capacitor 73 and therefore switches in a different differentiator compatible with the frequency range of the switch rendered operative.

When the received signal is no longer capable of activating a particular average integrator, the associated diode (82, 83, 84, or 85) will become nonconductive, and through the action of the long time constant integrator which had stored therein the voltage received from the average integrator, the bistable switch will be returned to its nonconductive state. The voltage from the long time constant integrator is coupled through the conductor leading from the base of the first transistor (42, 50, 58, or 66) through a resistor to the collector of the last transistor (44, 52, 60, or 68) of the bistable amplifier switch.

The hold function of the circuit is accomplished by the fact that the bistable switches are bistable and during a pause in the received signal each will retain the condition that was present just prior to the pause. Thus, the bistable switches act as a holding circuit for the decision made just prior to the pause and will not return to their quiescent state due to the bistable characteristic. This hold function will, therefore, maintain the particular differentiator selected in an operative relationship to the input signal being coupled through the diode gate differentiator selector.

In this particular embodiment the range of frequencies encompassed by the device is divided into five segments, each with a different differentiator (i.e., RC differentiating constants) to provide differentiation of the input signal in discrete ranges so as to provide a system having relatively constant voltage output over a very wide frequency range. The differentiator capacitor for the highest frequency segment is the 0.0011 mfd. capacitor 73. The differentiator capacitor for the next lowest frequency segment is the 0.0011 capacitor 73, in parallel with the 0.0033 mfd. capacitor 74. The differentiator capacitor for the next lowest segment is the 0.0011 mfd. capacitor in parallel with the 0.033 mfd. capacitor 75. The differentiator capacitor for the next lowest frequency segment is the 0.0011 mfd. capacitor in parallel with the 0.2 mfd. capacitor 76. The differentiator capacitor for the lowest frequency segment is the 0.0011 mfd. capacitor in parallel with the 1.0 mfd. capacitor 77. Resistor 86 is the resistive component of the RC differentiator.

Buffer amplifier 78 provides signal isolation, amplification, and drives the diode gate differentiator selector. Amplifier 80 is used to amplify the differentiated signal and provide at the output terminal 81 a signal at a level and at an output impedance suitable for further utilization equipment.

It will be understood that various changes in the details, steps, components, time constants, and circuitry to provide the functional operations, which have been herein described and illustrated in order to explain the nature of the invention, may be made by those skilled in the art within the principle and scope of the invention as expressed in the following appended claims.

We claim:

1. An automatic differentiator selector system for differentiating a complex input wave signal and providing an output signal proportional to the derivative of the said input signal, the said system comprising: means for sensing the zero-crossings of the said input wave and providing an output signal responsive thereto; a plurality of average integrating means, each having a different time constant of integration, responsive to the output signal of the said zero-crossings sensor, providing an average integration output signal; a plurality of long time constant integrating means in one-to-one correspondence to the said average integrating means, each long time constant integrating means responsive to the average integration output of its corresponding average integrating means, providing an output voltage; means for providing a plurality of determined voltages in one-to-one correspondence with said plurality of long time constant integrating means; a plurality of voltage comparison means in one-to-one correspondence with the said plurality of determined voltages for comparing the said corresponding determined voltage with the output voltage of the corresponding long time constant integrator, providing an output voltage; a plurality of bistable switch means in one-to-one correspondence with said plurality of voltage comparison means, each providing an output signal responsive to the voltage output of its corresponding voltage comparator; a plurality of resistance-capacitance differentiating means in one-to-one correspondence with said plurality of bistable switch means; and a plurality of diode gate switching means in one-to-one correspondence with said plurality of bistable switch means responsive to the said output signal of its corresponding bistable switch means for switching corresponding resistance-capacitance differentiating means whereby a resistance-capacitance differentiator is selected responsive to the characteristics of the said signal to be differentiated.

2. An input signal recognition system comprising: direct current restoration means, responsive to the said input signal, including at least a diode, a capacitance, and a resistance; average integration means having a defined resistnce and capacitance time constant of integration, wherein said resistance member of said resistance-capacitance time constant is also a resistive element in the said direct current restoration means, said average integration means being responsive to said restoration means; long time constant integration means including at least a resistance and capacitance defining a time constant of integration, providing an output voltage responsive to the said average integration means; means for providing a fixed bias potential including at least a transistor and a resistance element connected to the base of the said transistor wherein the said base connected resistance of the said fixed bias means is also a said resistance of the long time constant integrating means; switching means including a bistable amplifier having an input transistor and a resistance connected to the base of the said input transistor, wherein the said transistor and resistance of the said bistable amplifier are also the said transistor and resistance of the said fixed bias potential means, the said switching means providing an output indicative of the relative potential magnitudes of the said output voltage of the long time constant integrating means and the said fixed bias potential whereby the said bistable amplifier means provides an output responsive to the characteristics of the said input signal.

3. A system for differentiating a complex wave input signal comprising in combination: means including a diode ring clipper and multivibrator for sensing the zero-crossing of the said input wave and providing an output signal responsive thereto; a plurality of average integrating means, each having a different time constant of integration, selectively responsive to the output signal of the said zero-crossing sensor providing an average integration output signal; a plurality of long-time constant integrating means in one-to-one correspondence to the said average integrating means, each long time constant integrating means responsive to the average integration output of its corresponding average integrating means, proving an output voltage; means for providing a plurality of determined voltages in one-to-one correspondence to the said plurality of long time constant integrating means; a plurality of voltage comparison means in one-to-one correspondence to the said plurality of determined voltages for comparing the said corresponding determined voltage with the output voltage of the corresponding long time constant integrator, providing an output voltage; a plurality of bistable switch means in one-to-one correspondence with the said plurality of voltage comparison means, each providing an output signal responsive to the voltage output of its corresponding voltage comparator; a plurality of resistance-capacitance differentiating means each with a different time constant of differentiation, in one-to-one correspondence with the said plurality of bistable switch means; means for connecting the said complex wave input signal to each of the said plurality of resistance-capacitance differentiating means; and a plurality of diode gate switching means in one-to-one correspondence to the said plurality of bistable switch means each responsive to the said output signal of its corresponding bistable switch for selectively switching the corresponding resistance-capacitance differentiating means in operable relationship with the said input signal whereby the said input signal is differentiated with a resistance-capacitance differentiator having a time constant of differentiation responsive to the frequency characteristics of the said input signal.

4. In a complex wave differentiating system having resistance-capacitance differentiators and a zero-crossing sensor providing square wave signals inversely related to the frequency of the complex input wave, the apparatus for selecting a particular differentiator in accord with the frequency characteristics of the input signal, said apparatus comprising: a direct current restorer means for minimizing duty cycle variations responsive to the zero-crossings sensor; average integration means selectively responsive to said direct current restorer means; long time constant integration means responsive to said average integration means; a fixed voltage means; comparator means responsive to the said long time constant integration means and the said fixed voltage means; a bistable amplifier means responsive to the said comparator means; and a diode switch means responsive to the said bistable amplifier means for switching the said particular differentiator into operable relation with the said complex input wave whereby the said input wave is differentiated.

References Cited

UNITED STATES PATENTS

| | | | |
|---|---|---|---|
| 3,018,442 | 1/1962 | Goodman | 328—127 X |
| 3,293,635 | 12/1966 | Jankovich | 307—229 X |

DONALD D. FORRER, *Primary Examiner.*

U.S. Cl. X.R.

235—183; 307—235; 328—127